United States Patent [19]
Hareng et al.

[11] Patent Number: 4,525,709
[45] Date of Patent: Jun. 25, 1985

[54] ELECTRICALLY CONTROLLED DISPLAY DEVICE

[75] Inventors: Michel Hareng; Jean-Noël Perbet; Michel Defrance, all of Paris, France

[73] Assignee: Thomson-CSF, Paris, France

[21] Appl. No.: 410,706

[22] Filed: Aug. 23, 1982

[30] Foreign Application Priority Data

Aug. 25, 1981 [FR] France .................. 81 16216

[51] Int. Cl.$^3$ ............................. G09G 3/36
[52] U.S. Cl. ................... 340/719; 340/718; 340/784; 350/332
[58] Field of Search .......... 340/718, 719, 784, 765, 340/752, 783; 350/333, 332, 336; 357/50, 49, 51

[56] References Cited

U.S. PATENT DOCUMENTS

| | | | |
|---|---|---|---|
| 4,233,603 | 11/1980 | Castleberry | 340/784 |
| 4,403,217 | 9/1983 | Becker et al. | 340/784 |
| 4,427,266 | 1/1984 | Hosokawa | 350/332 |

FOREIGN PATENT DOCUMENTS 0011408 10/1979 European Pat. Off.

OTHER PUBLICATIONS

*IEEE Transactions on Electron Devices,* vol. ED-26, No. 8, Aug. 1979, by: D. E. Castleberry, "Varistor-controlled Liquid-crystal Displays", pp. 1123-1128.

*Primary Examiner*—Gerald L. Brigance
*Attorney, Agent, or Firm*—Oblon, Fisher, Spivak, McClelland & Maier

[57] ABSTRACT

The invention relates to a screen with matrix access which makes use of a varistor as a switching element to control the orientation of the molecules forming a liquid crystal layer. The invention has as its object the elimination of the passive surfaces of the varistor substrate and their replacement by an insulating material having a low dielectric constant.

7 Claims, 5 Drawing Figures

ELECTRICALLY CONTROLLED DISPLAY DEVICE

BACKGROUND OF THE INVENTION

The present invention relates to a screen having matrix access, which makes it possible to represent an image by splitting the same into a set of dots or elements whose appearance varies as a function of control signals applied to electrodes delimiting these elements. This screen makes use of a material of which the optical properties may be modulated electrically. The control signals are fed to the electrodes through non-linear resistors acting as switching elements.

The principle of the flat screen consists in dividing the screen into M identical elements which are generally square or rectangular. These elements may be addressed individually. The definition of the screen is a function of the number of dots able to receive an information. Each dot must consequently be exposed to an electrical field. This may easily be envisaged for a screen comprising some tens of dots. Direct access utilising a wire to each element becomes practically impossible for high definition screens (exceeding $1.5 \times 10^4$ dots). An easily realisable display of the matrix type has consequently been contemplated. Each screen element is then defined by the intersection of two grids of orthogonal conductors referred to as lines and columns: the number of connections changes from $M \times N$ to $M + N$. The saving on connections is considerable for a high resolution screen.

The addressing of a screen element by means of control voltages applied to the line and column in question need not be retained if a temporal multiplexing technique is adopted which renders it possible to refresh the screen state by recurrence. This technique is based on a persistence effect which may be physiological or available within the screen element. In the case of liquid crystal display devices, the elementary cell may be likened to a capacitor of which the time constant is adequate to maintain the charge between two successive transient addressing actions. In order to apply the control voltage in a short time, a non-linear resistor, meaning an element of the varistor type which is practically an insulator below a voltage threshold and becomes increasingly conductive beyond this threshold, is connected in series with the capacitive cell. A convenient manner of producing the varistor elements collectively consists in utilising as a substrate, a block of varistor material occupying the same area as the screen. This procedure results in producing a parasitic capacitance able to impair the satisfactory operation of the screen, across the terminals of each varistor element.

With a view to overcoming this disadvantage, the invention makes provision for machining the varistor material substrate in such a manner as to leave proud no more than islets or small regions forming the non-linear resistors. To restore the plane form of the substrate, the depressions surrounding the islets are filled with a dielectric material having a substantially lower permittivity than that of the varistor material.

SUMMARY OF THE INVENTION

The invention has as its object a screen display device intended to display images by electrical control over elementary display cells formed at the surface of substrate produced from a material of which the resistance is a decreasing function of the voltage applied; each cell comprising a material of which the optical properties vary as a function of an electrical field generated by a first and a second electrodes forming a capacitor; each cell being connected to electrical connections via a varistor element corresponding to a portion of the said substrate, in which the surface of the said substrate opposite the said cells comprises recesses delimiting islets; the said recesses being filled with a dielectric material of lower permittivity than that of the said substrate; each islet being related to the integration of the said resistive element.

BRIEF DESCRIPTION OF THE DRAWINGS

A better understanding of the invention will be gained from the following description taken in conjunction with the accompanying drawings, in which.

DESCRIPTION OF THE PREFERRED EMBODIMENTS

Figure 1:
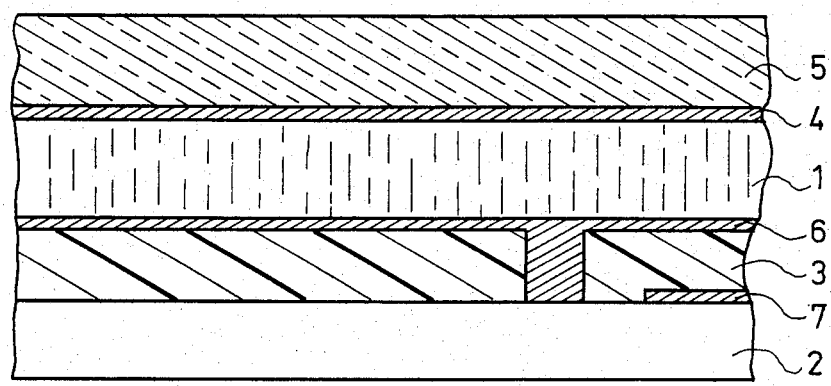
FIG. 1 is a view in cross-section of an elementary cell in accordance with the prior art.

In FIG. 1 is illustrated a cross-sectional view of a prior art elementary cell. A substrate 2 of resistive material of the varistor type is coated with an insulating material 3 carrying an electrode 6. The sheet 5 extends above the substrate 2 to which it is secrued via spacers which are not illustrated; this sheet 5 is transparent and carries an electrode 4. Between the electrodes 4 and 6 is disposed a liquid crystal layer 1. This cell forms an element of a screen enabling matrix access, for example. The control voltages for the liquid crystal layer 1 are supplied via line and column connections. When the lines and columns interconnect several cells, the actuation of one cell creates an electric switching field, but other cells which are not to be switched may be the seat of undesirable electrical interference fields.

In effect, so that a dot of the screen (i,j) defined by the line i and the column j may be exposed to an electrical field $E_{ij}$, the line i must be at the potential $V_i$ and the column j at the potential $V_j$. Because of these potentials present on the line i and on the column j, other points of the electro-optical material may be the seat of lesser electrical fields giving rise to undesirable conditions. To eliminate this drawback, each element of the screen should react only beyond a particular threshold voltage. To this end, it is known that a varistor placed in series with each dot which is to be energised may be utilised as a switching element.

In accordance with this principle, each screen dot is placed in series with a varistor (VDR). This latter is a ceramic element whose conductivity varies considerably beyond a threshold voltage $V_s$. The theoretical response of a combination of this kind then depends mainly on this threshold voltage $V_s$:

for $V \leq V_s$, the impedance of the varistor is high compared to that of the liquid crystal cell, so that there is no flow of charging current, V being the potential difference across the varistor terminals, for $V \leq V_s$, the impedance of the varistor drops and the electro-optical element receives a charging or discharging current. When the voltage V drops lower than Vs, the impedance of the varistor is high again compared to that of the liquid crystal and the capacitance formed by the cell is discharged slowly with a time constant $\tau$ proportional to this capacitance and to the leakage resistance of the system. Consequently, it is sufficient to refresh a display of this kind within a shorter time period than this storage period by means of a renewed voltage pulse such that $V \geq V_s$. By setting Vs at a value greatly exceeding the threshold of the electro-optical material, it is possible to obtain shorter response periods and thus high multiplexing rates N:

$$N = T/t$$

where: T=time elapsed between two refreshings of the charge, and t=the charging time determined by the product $R \times C$ during the operating phase in which the threshold Vs is exceeded.

In a display of this type, the ceramic varistor is utilised as a substrate. Two kinds of structure may be produced:

a so-called transverse structure in which the varistor current passes through the thickness of the substrate. Its principal disadvantage is that it requires a small substrate thickness if it is wished that the threshold voltage should be reasonably low (typically: 20 to 70 V for 0.1 mm).

a so-called longitudinal structure, in which the varistor current flows parallel to the surface of the substrate surface. This structure enables the use of thicker substrates but requires small connectors which are difficult to install through insulating materials of considerable thickness.

In the case of FIG. 1, it is a longitudinal structure in which the varistor action is obtained at the surface. For example, the electrode 6 is square or rectangular and delimits the cell. The electrode 4 forms part of one of the columns of the matrix grid. The electrodes 4 and 6 are placed opposite one another. The lines 7 are situated on the substrate 2 which provides the electrical connection between the lines and the electrodes 6.

These structures raise many problems regarding construction, related to the high dielectric constant of the varistor ceramic forming the substrate 2: the apparent order of magnitude of $\epsilon$ extends from $100\epsilon°$ to $1000\epsilon°$, $\epsilon°$ being the permittivity of the open-circuit state. The voltage must be applied to the varistor without energising the electro-optical element.

Figure 2:
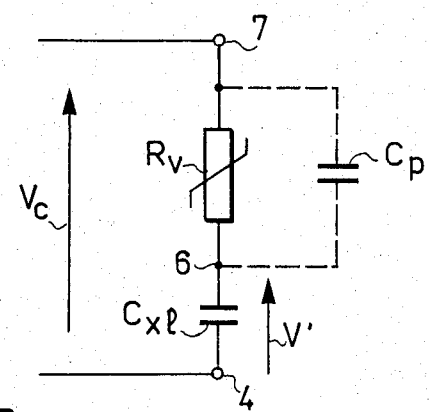
FIG. 2 is an equivalent electrical diagram.

FIG. 2 is an electrical diagram equivalent to the cell described above. $R_v$ denotes the resistance of the varistor element providing the connection between a line 7 and an electrode 6. $C \times 1$ is the capacity of the capacitor formed by the layer of liquid crystal disposed between the electrodes 4 and 6. It is apparent that when a voltage $V_c$ is applied across the terminals of the cell and the varistor element is not conductive, the liquid crystal is submitted to an interference voltage $$V = V_c \frac{C_p}{C_p \times C \times 1}.$$

During an operation by pulses, the interference capacity Cp of the varistor should consequently be reduced compared to that $C \times 1$ of the electro-optical element. A means of reducing the proportion of Cp due, among other things, to the closeness of the electrodes 6 and 7, is to select a comparatively thick insulating layer 3. To this end, substantial insulator thicknesses should be utilised (exceeding 25 microns) which makes it difficult to establish a contact of small area. It is observed that a sizable proportion of the capacity Cp derives from electrostatic coupling with a medium having a high dielectric constant. The active varistor surface being small compared to the screen surface, an effective means of reducing the capacity Cp consists in replacing the volumes of high permittivity adjacent to the varistor by volumes of insulating material of low dielectric constant, compatible with the electro-optical material utilised.

Figure 3:
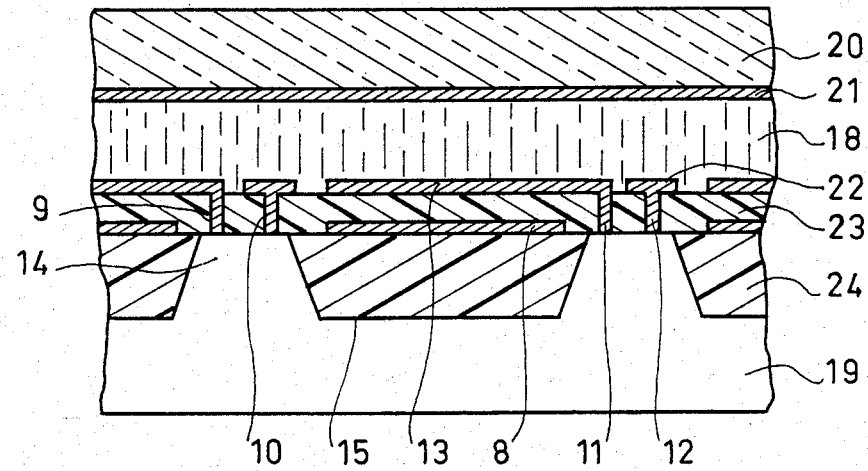
FIG. 3 is a view in cross-section of a part of the screen in accordance with an embodiment of the invention.

FIG. 3 illustrates, by way of non-limiting example, a partial view in cross-section of a screen comprising a layer of electro-optical material 18 controlled by a varistor 19. A layer of liquid crystal has been selected for utilisation as an electro-optical material in the present invention.

It is known that an electrical field may be applied to a liquid crystal to alter the orientation of its molecules in order to modulate the incident light. The mesomorphic materials consist of elongated molecules which may be set directionally in the presence of a solid surface, along a common direction which may be either parallel to or perpendicular to the plane of the surface. The direction of this orientation depends on the respective natures of the liquid crystal and surface materials. The orientation of the long molecules of the liquid crystal is greatly facilitated moreover by the introduction of traces of appropriate surface-active agents into the mesomorphic substance, as well as by an initial treatment of the surfaces in contact with the film (surface polishing, evaporation under skimming incidence of a silicon oxide film). Depending on the effect required, use will be made of a mesomorphic material having one or the other of the 3 following phases: smectic, nematic and cholesteric. It is advantageous to make use, for a screen of this kind, of a nematic-cholesteric mixture which has a slight storage action, in which it is possible to disperse particles forming a dichroic pigment in such a manner as to secure a modulator action based on the dichroic selection.

In FIG. 3, the liquid crystal layer 18 is disposed within the space left unfilled between the transparent sheet or pane 20 (for example of glass) on the one hand, and the varistor substrate 19 bearing an insulating layer 23 on the other hand. This space of some ten microns is established by spacing shims which are not shown. In this embodiment, the liquid crystal layer is for example transparent in the rest condition. To control the orientation of the molecules of the liquid crystal 18, use may be made of an electrical field so as to obtain a double refraction effect, or of a conduction current so as to obtain a dynamic diffusion effect.

It is equally within the ambit of the invention to make use of a layer of liquid crystal formed by a nematic-cholesteric mixture having a diffusing state in the idle condition and to render the same transparent by application of an electrical field which orients its molecules in the direction of the field.

The varistor may be formed by an agglomerate of a powder of zinc oxide (ZnO) which contains particles of bismuth oxide ($Bi_2O_3$) and of manganese oxide ($MnO_2$) to improve the characteristics of the varistor. The varistors have the property that they have a resistance which is non-linear and highly dependent on the voltage to which they are submitted. The substrate 19 is selected from amongst materials whose I=f(V) characteristic displays a particular pronounced bend around a threshold voltage Vs.

In FIG. 3, each screen element is defined by an electrode 13 of which the dimensions are of the order of one millimeter. This electrode, which must be reflective, is produced from aluminium. A layer 23 of insulating material of a thickness of 1 to 2 microns insulates the liquid crystal layer 18 and the electrodes 13 from the varistor substrate 19. The electrodes are positioned in mutually parallel rows. Each row of electrodes as itself parallel to a line connection 22 serving the purpose of supplying the voltages required for matrix addressing. The column connections 21 are transparent and are formed by a deposit of tin or indium oxide, or of a mixture of these two oxides. These columns are positioned at right angles to the rows of electrodes 13, each column covering all the electrodes of the rows it intersects. The control voltages intended for the electrodes 13 are supplied via lines 22 having a width of approximately 50 microns. The width of these lines must be small compared to the dimensions of the electrodes 13. In effect, whilst receiving the whole addressing voltage, of which a part only will be transferred to the electrodes 13, the lines 22 are able to energise the electro-optical element 18. The reduced width of these lines may render this effect negligible. It is also within the scope of the invention to cover the lines 22 with an insulating material or to make these non-reflective, in order to resolve this problem.

The connection between the lines 22 and the electrodes 13 is established via the varistor substrate 19, through the insulating layer 23 which may be a photopolymer. A connection to the varistor 19 has been established for each electrode by means of a hole 9 formed through the insulating layer 23, in which a contact element 11 serves the purpose of establishing the electric contact between the electrode 13 and the varistor 19. A hole 10 and a contact element 12 are provided to effect the connection between the lines 22 and the varistor 19. The connecting elements 11 and 12 are positioned as close to each other as possible, in such a manner as to reduce the threshold voltage Vs of the varistor. In the preceding embodiments, use was made of substantial thicknesses for the insulating material 23 (exceeding 25 microns), in view of the high dielectric coefficient of the varistor material, to eliminate particular parasitic capacities. With thicknesses of this kind, it was difficult to form holes 10 and 9 of small diameters through the insulating material 3 so as to obtain contacts of small area.

The invention also has as its object a screen in which each electrode 13 is addressed individually and in which the columns 21 are replaced by a single electrode.

To eliminate the inactive areas of the varistor and to reduce the parasitic capacities introduced into the system by the varistor because of its high dielectric constant, the internal surface of the substrate 19 comprises projecting areas 14 of small surface, separated by recesses 15. These recesses are produced by photo-engraving by means of an acid or a base or by any other process, for example mechanical, and, are then filled with an insulating material 24 such as a resin or an enamel having a low dielectric coefficient, and which may possibly be applied by a silk screen process. If necessary, the upper surface of the substrate may be ground so as to enable insulating materials and electrodes to be deposited in thin layers. The problem of thick insulating materials and of small-area contacts established through this insulating material, then no longer exists. It is thus possible to produce the upper structure in a thin or thick layer depending on the required screen resolution.

Figure 4:
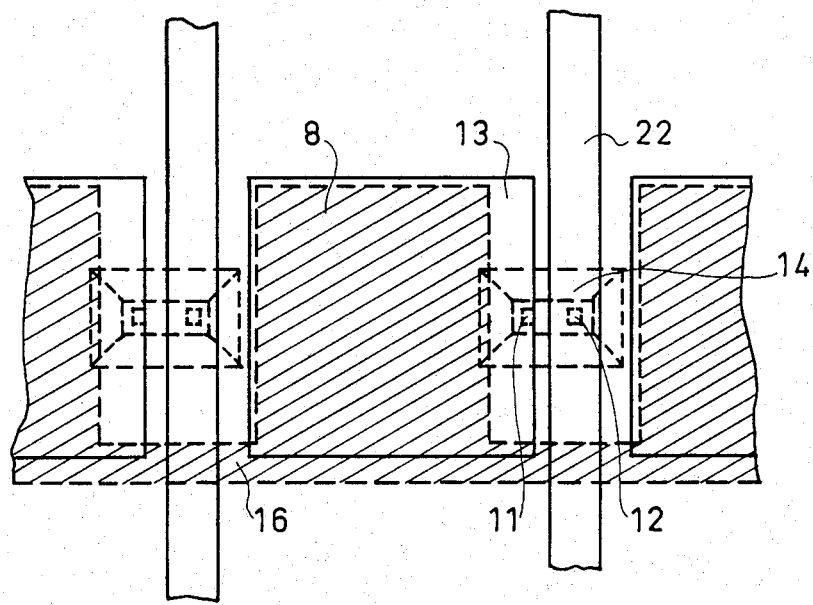
FIG. 4 is a view from above of a part of the screen.

FIG. 4 is a view from above of a part of the screen, assuming the sheet 20 and the liquid crystal layer 18 to have been removed. It is apparent from this figure, that the areas 14 have a smaller surface area as compared to the remainder of the substrate 19.

To increase the storage period $\tau$ of the information in the electro-optical element, it is possible to introduce a storage capacity in parallel on the display element. To this end, a second electrode 8 is situated between the insulating material 24 and the insulating material 23 and opposite each electrode 13. The two electrodes 13 and 8 separated by the insulating layer 23, thus form a capacitor. FIGS. 3 and 4 show how the electrodes 8 are arranged. The capacity thus formed is connected in parallel with each element of the layer of liquid crystal to increase its capacity. The electrode 13 is a common electrode. The electrodes 8 are connected to the columns facing them, via the conductor 16. Each conductor 16 is connected externally to the column of the same order.

Figure 5:
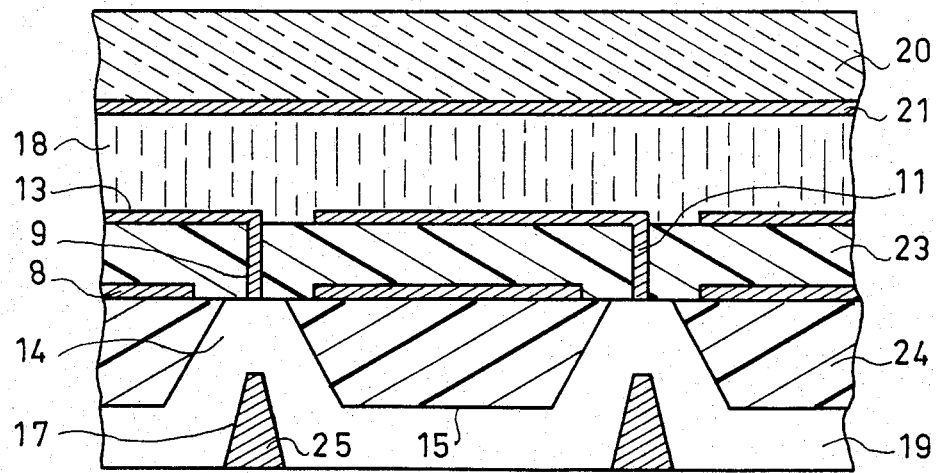
FIG. 5 is a partial view in cross-section of a screen devised with a transverse structure.

The screen described above is produced in accordance with a longitudinal structure, but a transverse structure could be contemplated just as easily. The lines would then be arranged on the external surface of the varistor substrate. FIG. 5 is a partial view in cross-section of a screen constructed with a transverse structure. The lines 25 are deposited in locations 17 formed in the external surface of the substrate 19. The insulating material 24 having a very low dielectric constant, the field lines created by application of a voltage across the terminals of a screen element are returned along a path practically parallel to the direction of alignment of the lines 25 and of the contact pieces 11. Since the active areas of the substrate have been reduced considerably, it is no longer necessary to have a substrate of small thickness with this structure. The dielectric blocks 24 plays a large part in reducing the extraneous capacity Cp.

The screen according to the invention eliminates the problem of the contacts of small surface area established through a thick insulating material. It enables to produce easily a storage capacity for each screen element and to reduce the parasitic capacity of the varistor as compared to that of the electro-optical element.

What is claimed is:

1. A display device comprising:
   a cell intended to display images by electrically controlling elementary display pixels formed on a first surface of a substrate wherein said substrate is produced from a substance of which the resistance is a decreasing function of the applied voltage, and wherein each pixel comprises a first and second electrode forming a capacitor, the material of which varies in optical properties as a function of an electrical field generated across said capacitor, each pixel being connected to electrical connections via a varistor element corresponding to a portion of the said substrate, wherein said first surface of the said substrate which is adjacent the said pixels comprises recesses which delimit islets; the said recesses being filled with a dielectric substance having a lower permittivity than that of the said substrate, each islet comprising one of said varistor elements.

2. A display device according to claim 1 further comprising:
   a matrix grid of lines and columns for providing an electric field to said pixels.

3. A display device according to claim 2, in which third electrodes corresponding to said first electrodes are placed on the said dielectric material and opposite the said first electrodes so as to form capacitors, an insulating layer is disposed between the said first and third electrodes, the said corresponding first and third electrodes corresponding to the same column, each said third electrode being connected externally to its corresponding column via a conductive strip.

4. A display device according to claim 1, in which the said electro-optical material is a liquid crystal.

5. A display device according to claim 4, in which the said liquid crystal is a nematic-cholesteric mixture.

6. A display device according to claim 4, in which the said liquid crystal comprises a dichroic pigment.

7. A display device according to claim 4, in which a treatment of at least one surface of said substrate is effected so as to promote a preferential directional setting of the molecules forming the liquid crystal.

* * * * *